2,707,486

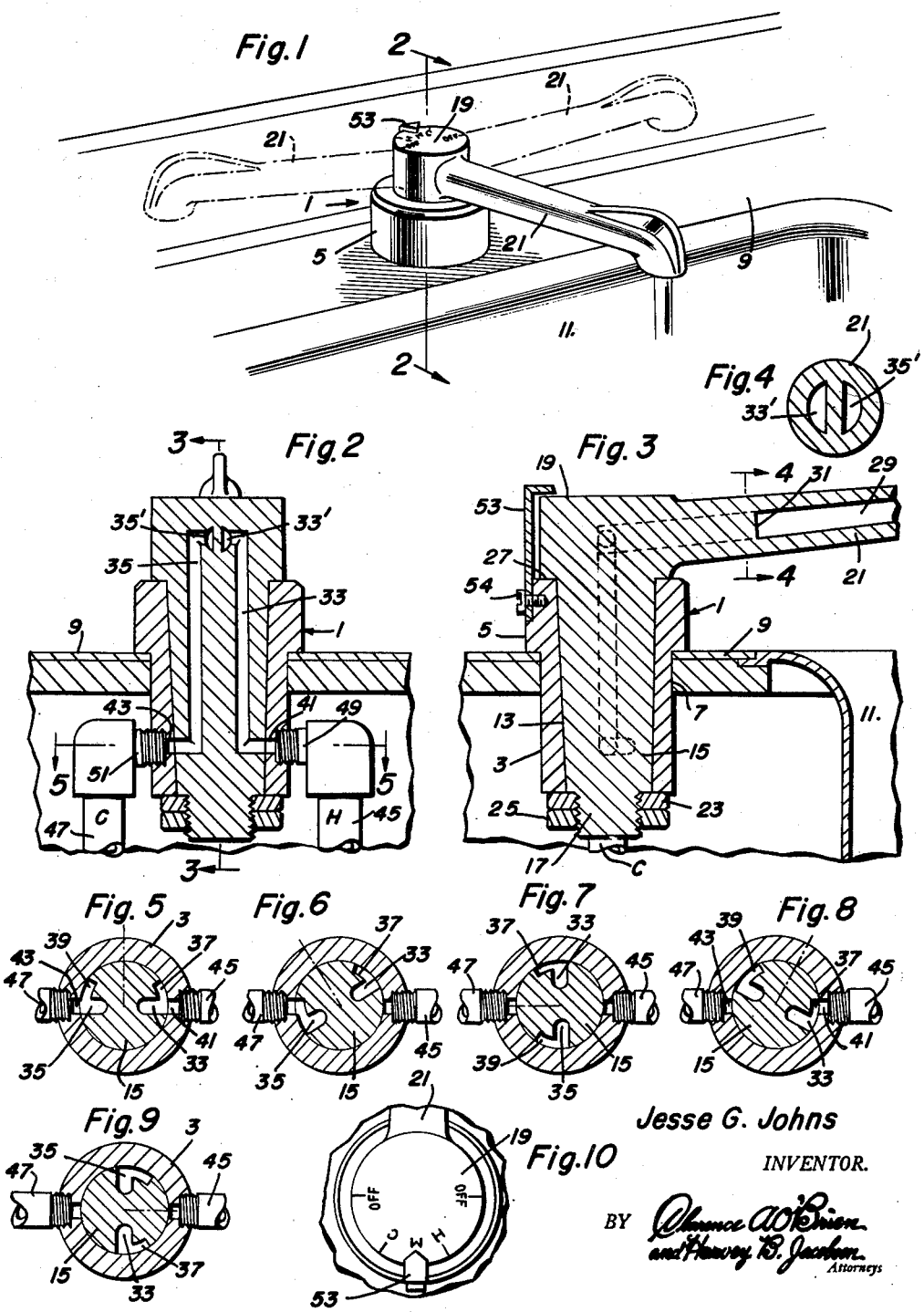

HOT AND COLD WATER MIXING FAUCETS

Jesse G. Johns, Cut Bank, Mont., assignor of eighty per cent to Gladys B. Wright, Cut Bank, Mont.

Application November 24, 1952, Serial No. 322,203

1 Claim. (Cl. 137—625.41)

My invention relates to improvements in hot and cold water mixing faucets for kitchen sinks, laundry tubs, bathroom basins, tubs and the like.

The primary object of the invention is to provide a faucet adapted to be rendered leak proof and dripproof without taking apart to replace worn or defective valve parts.

Another object is to provide a hot and cold water mixing faucet with an improved valve and nozzle constructed and arranged so that the hot tand cold water is mixed in the nozzle and not in the valve, whereby to obviate a mixing chamber or the like in the valve and thereby reduce corrosion in the valve.

Still another object is to provide in such a faucet for control of hot and cold water discharge selectively, either separately, or in mixture, by sidewise moving in slight degree of the nozzle of the faucet.

Still another object is to provide a faucet of the type and for the purposes above indicated which is easy to install, simple and practical in construction, and comparatively inexpensive to manufacture.

Other and subordinate objects, within the purview of my invention, together with the precise nature of my improvements and the advantages thereof will be readily understood when the succeeding description and claim are read with reference to the drawing accompanying and forming part of this specification.

In said drawing:

Figure 1 is a view in perspective of my improved faucet in the preferred embodiment thereof installed in a basin;

Figure 2 is an enlarged view in vertical section taken on the line 2—2 of Figure 1;

Figure 3 is a view in vertical section taken on the line 3—3 of Figure 2;

Figure 4 is an enlarged view in transverse section taken on the line 4—4 of Figure 3;

Figure 5 is a view in transverse section taken on the line 5—5 of Figure 2 and showing the intermediate mixture position of the valve core;

Figures 6, 7, 8 and 9 are similar views illustrating the hot and cold water discharge positions of the valve core and its off positions, and Figure 10 is a fragmentary view in plan of the faucet.

Referring to the drawing by numerals, the faucet of my invention comprises a valve 1 including a tubular casing member 3 having an enlarged, circular end head 5. As shown, the casing member 3 is adapted to be fitted and suitably fixed in an upright position in an aperture 7 in the ledge 9 of a basin 11, or the like, with the head 5 fitting flush on said ledge, and said member is provided with a downwardly tapering axial bore 13.

A downwardly tapering valve core 15 is rotatably fitted in the bore 13 of the casing member 3 with a reduced lower, threaded end 17 and an enlarged circular head 19 having a nozzle 21 formed integrally therewith to extend substantially radially therefrom, but in slightly upwardly inclined position from what constitutes the front side of said head 19.

A retaining nut 23 on the threaded end 17 turned against the lower end of the casing member 3 secures said core in the bore 13, and a lock nut 25 on said end 17 retains said nut 23 in place. The nut 23 and lower end of said member 3 form therebetween a water tight seal at the lower end of the bore 13. The head 19 forms an undercut shoulder 27 on the core 15 which is rotatably seated flush, when the nut 23 is properly tightened, on the head 5 to form a water tight seal at the upper end of the bore 13.

The bore 29 of the nozzle 21 is formed with an inner end 31 spaced forwardly of the head 19 of the core 15 and a pair of relatively smaller diameter hot and cold water supply ducts 33, 35 are provided in the valve core 15 at diametrically opposite sides thereof and of said nozzle 21 and which extend longitudinally and laterally in said core with right angled upper ends 33', 35' extending forwardly in the head 19 and nozzle 21 to said inner end 31 to discharge into the nozzle 21 forwardly of the valve 1 for mixing of hot and cold water in the nozzle and not in the valve.

The hot and cold water supply ducts 33, 35 at their lower ends thereof open into terminal, short circumferential grooves 37, 39 in the valve core 15 extending circumferentially in said core in the same direction and being coplanar with a pair of hot and cold water supply ports 41, 43 in diametrically opposite sides of the casing member 3 below the ledge 9.

The conventional hot and cold water supply lines 45, 47 below the basin 9 discharge into the ports 41, 43 by way of nipples 49, 51 thereon threaded in said casing member 3 in communication with the hot and cold water supply ports 41, 43.

The valve core 15 is rotatable by lateral swinging of the nozzle 21 into an intermediate mixture supply position, a cold water supply position, a hot water supply position, and opposite off positions all of which are indicated by indicia on top of the head 19 for registration with an upstanding pointer 53 secured by a screw 54 to the back of the head 19.

In the mixture supplying position of said core 15, shown in Figures 1, 3, 4 and 5, the nozzle 21 stands straight forwardly over the basin 11 and the grooves 37, 39 register with the hot and cold water supply ports 41, 43, as shown in Figure 5. By swinging the nozzle to the right, substantially 30° from its intermediate position, the valve core 15 will be correspondingly rotated to revolve the groove 37 of the hot water supply duct 33 out of registration with the hot water supply port 41 while the groove 39 of the cold water supply duct 35 still registers with the cold water supply port 43, and the valve core thus rotated into cold water supplying position shown in Figure 6. By further swinging of the nozzle 21 in the same direction, the valve core 15 may be rotated into one off position with the nozzle 21 at the right hand side of the valve 1 over the ledge 9 as shown in Figure 7, and, as regards the nozzle 21, as shown in dotted lines in Figure 1. Swinging of the nozzle 21 toward the left from the intermediate position thereof, substantially 30°, will rotate the valve core 15 into hot water supplying position in which the groove 39 of the cold water supply duct 35 is revolved from registration with the cold water supply port 43 while the groove 37 of the hot water supply duct 33 still registers with the hot water supply port 41, all as shown in Figure 8. Further swinging of the nozzle 21 toward the left will rotate the valve core 15 into its other off position, as shown in Figure 9, in which the nozzle 21 is swung to the left of the valve 1 over the ledge 9. As will of course be understood, in both off positions of the valve core 15, the grooves 37, 39 are out of registration with the supply ports 41, 43.

As will be clear, by splitting the hot and cold water supply ports 41, 43 by the ends of the grooves 37, 39, variable mixtures of hot and cold water may be supplied to vary the temperature of the mixture.

As will be seen, in all positions of the valve core 15 other than its off positions, the nozzle 21 discharges forwardly of the ledge 9 and therefore into the basin 11.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

What is claimed as new is as follows:

In a hot and cold water mixing faucet, a tubular valve casing having a pair of diametrically opposite hot and cold water supply ports therein, a valve core rotatable in said casing and having a head, a nozzle integral with said head and extending substantially radially forwardly therefrom for swinging to rotate said valve core, said nozzle having a bore terminating in an inner end spaced forwardly of said head a distance remote from said head to provide a mixing chamber in said nozzle remote from said core, and means in said core for communicating said hot and cold water supply ports with said inner end of the bore upon rotation of said core into one position whereby to mix hot and cold water in said nozzle remote from said core comprising a pair of longitudinal hot and cold water ducts in said core at diametrically opposite sides of the core and nozzle smaller in diameter than the bore in the nozzle and having upper right angled ends extending forwardly in said core and nozzle to the inner end of said bore at opposite sides of said bore, said core having short circumferential grooves therein communicating with said ports simultaneously upon rotation of said core by said nozzle into said one position to supply hot and cold water to said nozzle and adapted to communicate with said ports alternately upon rotation of said core by said nozzle in opposite directions into other positions to supply hot and cold water to said nozzle separately, said core being rotatable by said nozzle into still other positions to move said grooves out of communication with said ports, a nut threaded onto said core against one end of the casing for sealing said casing at said end, and a shoulder on said head engaging the other end of said casing to seal said casing at said other end.

References Cited in the file of this patent

UNITED STATES PATENTS

| | | |
|---|---|---|
| 7,007 | Duffey | Apr. 19, 1832 |
| 207,961 | Gillin | Sept. 10, 1878 |
| 992,332 | Brion | May 16, 1911 |
| 1,044,648 | Hamrick | Nov. 19, 1912 |
| 1,148,217 | Charles | July 27, 1915 |
| 1,842,894 | Breegle | Jan. 26, 1932 |